United States Patent
Dupuy et al.

(10) Patent No.: US 9,681,672 B2
(45) Date of Patent: Jun. 20, 2017

(54) TASTE-ENHANCING AGENT, BAKING DOUGHS, BREADMAKING AND CEREAL PRODUCTS COMPROMISING SAME, AND USE THEREOF AS AN NACL SUBSTITUTE

(75) Inventors: Camille Dupuy, Lille (FR); Pascal Lejeune, Tourcoing (FR); Jean-Jacques Muchembled, Marq en Baroeul (FR)

(73) Assignee: LESAFFRE ET COMPAGNIE, Paris (FR)

( * ) Notice: Subject to any disclaimer, the term of this patent is extended or adjusted under 35 U.S.C. 154(b) by 1044 days.

(21) Appl. No.: 10/588,853

(22) PCT Filed: Feb. 9, 2005

(86) PCT No.: PCT/EP2005/001292
§ 371 (c)(1),
(2), (4) Date: Aug. 9, 2006

(87) PCT Pub. No.: WO2005/087013
PCT Pub. Date: Sep. 22, 2005

(65) Prior Publication Data
US 2007/0172545 A1 Jul. 26, 2007

(30) Foreign Application Priority Data
Oct. 2, 2004 (FR) ...................... 04 01258

(51) Int. Cl.
*A21D 2/00* (2006.01)
*A21D 10/00* (2006.01)
(Continued)

(52) U.S. Cl.
CPC ............. *A21D 10/00* (2013.01); *A21D 2/268* (2013.01); *A21D 2/38* (2013.01); *A21D 8/04* (2013.01); *A23L 27/25* (2016.08); *A23L 33/14* (2016.08)

(58) Field of Classification Search
CPC ......... A01B 12/006; A21D 8/04; A23L 27/25; A23L 33/14
(Continued)

(56) References Cited

U.S. PATENT DOCUMENTS 3,914,450 A * 10/1975 Robbins ................. C12N 1/005
426/533
3,963,835 A * 6/1976 Gryczka ........................ 426/18
(Continued)

FOREIGN PATENT DOCUMENTS

DE 33 388 977 A 5/1985
EP 0 806 144 A 11/1997
(Continued)

OTHER PUBLICATIONS

Desmond, E. 2006. Meat Science. 74: 188-196.*
(Continued)

*Primary Examiner* — Hamid R Badr
(74) *Attorney, Agent, or Firm* — Sughrue Mion, PLLC

(57) ABSTRACT

Dry flavor enhancing agent for a cereal product and particularly for baked bakery products including yeast extract and acid fermented flour, dry enhancing agent for cereal products and particularly for baked bakery products including this dry flavor enhancing agent and their use in the preparation of cereal products and particularly doughs and baked products.

12 Claims, 1 Drawing Sheet

(51) Int. Cl.
*A21D 2/26* (2006.01)
*A21D 2/38* (2006.01)
*A21D 8/04* (2006.01)
*A23L 27/24* (2016.01)
*A23L 33/14* (2016.01)

(58) Field of Classification Search
USPC .......................................................... 426/18
See application file for complete search history.

(56) References Cited

U.S. PATENT DOCUMENTS

| | | | | |
|---|---|---|---|---|
| 4,093,748 A | * | 6/1978 | Akatsuka et al. | 426/19 |
| 4,243,691 A | * | 1/1981 | Mohlenkamp et al. | 426/649 |
| 5,108,766 A | * | 4/1992 | Gelinas et al. | 426/43 |
| 5,286,630 A | * | 2/1994 | Schanus et al. | 435/41 |
| 6,432,459 B1 | * | 8/2002 | Bel Rhlid et al. | 426/62 |

FOREIGN PATENT DOCUMENTS

| | | |
|---|---|---|
| EP | 1 352 564 A | 10/2003 |
| GB | 2 315 008 A | 1/1998 |
| ZA | 9 400 543 A | 6/1995 |

OTHER PUBLICATIONS

"Handbuch Sauerteig—Biologie—Biochemie—Technologie" by Spicher and Stephan, 4$^{th}$ edition (ISBN 3-86022-076-4), chapter 4.2.
"The Yeasts, a taxonomic study", 3$^{rd}$ edition, J.N.W. Kreger van Rij—1984.
"Glossary of Milling and Baking Terms", Samuel A. Matz, Pan-Tech International, 1993.

* cited by examiner

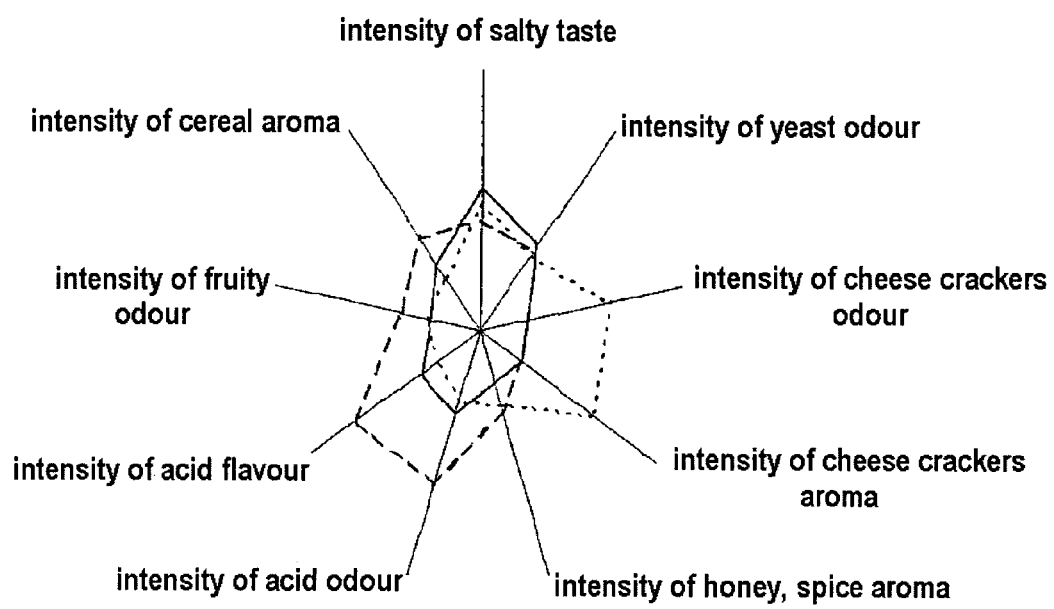

TASTE-ENHANCING AGENT, BAKING DOUGHS, BREADMAKING AND CEREAL PRODUCTS COMPROMISING SAME, AND USE THEREOF AS AN NACL SUBSTITUTE

This invention relates to a dry flavour enhancing agent for a cereal product and particularly for baked bakery products, such an agent in particular having the property of increasing the salty taste, and a dry breadmaking improver containing this flavour enhancing agent.

In general, the dry flavour enhancing agent according to the invention improves the gustative quality of cereal products, such as for example baked bakery products, regardless of the salt content (NaCl). It also lowers the salt content of cereal products.

Traditionally, salt is added to dough as a flavour enhancer, in breadmaking.

There has been a demand to reduce the quantity of salt present in food for many years. The reduction in the salt content of breads is an important step towards this direction. However, the reduction in salt added to baker's dough leads to bland baked products that the consumer usually does not like very much.

It has been proposed to add fermented flour to baker's dough as a flavour enhancer.

Within the framework of this invention, acid fermented flour, also called dehydrated fermented flour, is a dry product obtained by drying a fermented dough using micro-organisms belonging to sourdough bacteria and possibly also sourdough yeasts. Sourdough bacteria are described particularly in Chapter 4.2, and especially in 4.2.3 in the reference book "Handbuch Sauerteig-Biologie-Biochimie-Technologie" by Spicher and Stephan, $4^{th}$ edition (ISBN 3-86022-076-4). These bacteria are said to be lactic acid bacteria because they produce lactic acid during fermentation of the dough and thus contribute to the flavour enhancing effect.

According to the invention, fermented flour is acid due to the lactic acid contained in it. It is thus distinguished from the dry ferment described in patent ZA-A-9 400 543 (Unilever) which is obtained by fermentation of yeasts only, and has very different properties.

Acid fermented flour is usually marketed under French trade names such as farine fermentée (fermented flour), farine pré-fermentée (prefermented flour), levain sec (dry sourdough) or levain déshydraté (dehydrated sourdough), and English trade names such as dry or dried sourdough, dry or dried leaven or levain, dry or dried fermented flour, dry or dried preformented flour, sourdough concentrate, sourdough powder and sour flour, and under the German trade names Trockensauer and Sauerteigpulver.

The use of fermented flour as a preparation or aromatic agent in breadmaking leads to baked products having a pronounced acid taste and odour, and "toasted" type aromatic notes. Although such an acid taste and odour are strongly appreciated for some specific categories of baked products, they are poorly appreciated for others.

Therefore the use of fermented flour in breadmaking is limited to a particular range of baked products for which an acid flavour is appreciated.

It is known that yeast extracts have a flavour enhancing effect, among other effects. A yeast extract means the soluble fraction obtained after enzymatic hydrolysis of yeast cells preferably belonging to the *Saccharomyces* genus.

However, the use of yeast extract as a flavour enhancer in breadmaking as disclosed particularly in patent U.S. Pat. No. -4,093, 748 leads to baked products with particular aromatic notes, such as "cheese crackers". Therefore the use of yeast extract as a flavour enhancer in breadmaking is also limited to a range of specific baked products for which "cheese cracker" notes are desired.

It has also been proposed to reduce the salt content of breads by 25% by substitution of this 25% of salt by a mix of potassium chloride, whey and dextrose.

The use of potassium chloride is a conventional solution in the field of manufacturing low-salt (NaCl) products, because it is the sodium ion in common salt that can be bad for health, but this conventional solution has many well-known disadvantages.

This invention relates to a specific dry flavour enhancing agent for cereal products and particularly for bakery products, such a flavour enhancing agent having the particular property of improving the salty taste.

This invention relates particularly to a dry flavour enhancing agent for cereal products and particularly for baked bakery products that includes acid fermented flour and yeast extract.

Indeed, unexpected organoleptic synergetic effects have been observed, firstly between acid fermented flour and secondly yeast extract when these two agents are used in combination in mixes or doughs for cereal products and particularly for bakery products.

Thus, the agent according to the invention may be used as a flavour enhancer for a wide range of bakery products, without sensory notes usually considered as being unwanted occurring in the baked product.

According to the invention, fermented acid flour as defined above is obtained by drying a fermented dough containing one or several cereal(s) flour(s) that can be used for breadmaking, one or several flours derived from a bran enriched mill product or a mix of one or more cereal flours that can be used in breadmaking with one or several flours derived from bran enriched mill product. One example of such a mill product is micronised bran.

Thus, fermented acid flour can be obtained from a fermented dough containing wheat flour and/or rye flour, one or several flours derived from mill products rich in bran originating from wheat and/or one or several flours derived from mill product rich in bran originating from rye, or a combination of wheat flour(s) and/or rye flour(s) with one or several flours derived from mill product rich in bran and originating from wheat and/or rye.

It is desirable if the acid fermented flour has a total microbial flora of less than or equal to $10^6$ UFC (Units Forming Colony)/g, preferably less than or equal to $10^5$ UFC/g and more preferably less than or equal to $10^4$ UFC/g.

Also according to the invention, the yeast extract is preferably the soluble fraction obtained after autolysis of said yeast cells, in other words after enzymatic hydrolysis done only by endogenous yeast enzymes.

Yeast cells can also be hydrolysed by calling upon exogenous enzymes, in other words by adding supplementary enzymes and particularly proteases.

Yeast extract is preferably separated from the insoluble part of yeast cells. However, this separation of the insoluble fraction of yeast cells, from the solubilised fraction with the flavour enhancing effect searched for according to the invention, is desirable but not indispensable. The yeast extract is preferably in the form of a dry extract. The invention encompasses the use of all ingredients known as having a flavour enhancing effect equivalent to yeast extract.

Said yeast cells usually belong to the *Saccharomyces cerevisiae* species, frequently called *Saccharomyces carlsbergensis* in the case of brewer's yeast, the exact taxonomic term being *Saccharomyces cerevisiae* according to "THE YEASTS, a taxonomic study", 3$^{rd}$ edition published by N. J. W. Kreger van Rij-1984 (however according to the 4$^{th}$ edition of this book in 1998, *Saccharomyces carlsbergensis* has two synonyms, namely *Saccharomyces cerevisiae* and *Saccharomyces pastorianus*, but the 3$^{rd}$ edition dating from 1984 is used as a reference for this document). If the yeast extract comprises or is a brewer's yeast extract, in other words a yeast extract that has already been used for fermentation in a brewery, it may be useful to de-bitter the yeast extract before it is used within the scope of this invention. Brewer's yeast extracts are generally characterised by the presence of a detectable quantity of humulones, and it is preferable that this quantity should be as low as possible.

Advantageously, the agent according to the invention has a weight ratio between fermented acid flour dry matters and yeast extract dry matters equal to between 0.8 and 2.6; preferably between 1.0 and 2.3; even more preferably between 1.2 and 2.0; and even more preferably between 1.2 and 1.8.

As already mentioned above, acid fermented flour present in the agent according to the invention can be derived from a fermented dough comprising one or more cereal flour(s) comprising one or several flours derived from a bran rich mill product or comprising a combination of one or more cereal flours with one or several flours derived from bran rich mill products, this dough also possibly containing cereal germs. Preferably, the acid fermented flour is derived from a fermented dough comprising wheat flour and/or rye flour, one or several flours derived from bran rich mill products originating from wheat and/or one or several flours derived from bran rich mill products originating from rye, or a combination of wheat flour(s) and/or rye flour(s) with one or several flours derived from bran rich mill products and mill products derived from wheat and/or rye. The dough may also contain ground wheat germs.

The dose of lactic acid in fermented acid flour is advantageously greater than or equal to 50 g per kg of fermented flour and more advantageously at least 70 g per kg of fermented flour and even more advantageously at least 100 g per kg of fermented flour.

The agent according to the invention contains a yeast extract preferably belonging to the *Saccharomyces* genus and even more preferable belonging to the *Saccharomyces cerevisiae* species, including *Saccharomyces carlsbergensis*. Said yeast extract from the agent according to the invention may particularly contain and/or may be a brewer's yeast extract, this brewer's yeast extract preferably being debittered, this debittering possibly being done using normal and well known techniques.

The yeast extract contained in the agent according to the invention is preferably a yeast extract obtained without any added salt. Preferably, when the yeast extract comprises or is a brewer's yeast extract, the brewer's yeast extract will be judged by a tasting panel as being only very slightly bitter. Preferably, the yeast extract contained in the agent according to the invention will be judged by such a tasting panel as not having any or only few "milky", "buttery", "cheese" type notes and in general as having a neutral taste profile with no marked notes.

For example, the dry agent may be in powder form or in granules. Its dry matter content is advantageously greater than or equal to 85%, and preferably greater than or equal to 90%, and even more preferably greater than or equal to 93% or even more preferably greater than or equal to 96%.

The agent according to the invention may be incorporated into the formula of a dry improver for a baked bakery product. Such a dry improver according to the invention also comprises one or several ingredients with an improving effect, and particularly one or more ingredients chosen from the group consisting of ascorbic acid, emulsifiers, stabilizing-thickening agents and enzymes. The dry improver according to the invention may thus comprise one or more ingredients with an improving effect, such as:
    ascorbic acid,
    L-cysteine or deactivated yeast,
    stabilising-thickening agents such as:
        pre-gelatinised flour, modified starches,
        CMC (carboxymethylcellulose),
        gums, for example such as xanthan gum,
        algae extracts such as alginates or carraghenates,
        or a combination of these different stabilizing—thickening agents,
    emulsifiers, for example such as:
        lecithin or
        fatty acid mono- and diglycerides or
        diacetyltartric esters of mono- and diglycerides of fatty acids, etc.,
        or a combination of one or more emulsifiers like those mentioned above,
    enzymes, for example such as:
        amylases, and particularly alpha-amylases, including for example maltogenic alpha-amylase or other anti-staling alpha-amylases,
        hemicellulases, and particularly xylanases,
        glucose oxidases,
        amyloglucosidases,
        lipases,
        phospholipases, etc.,
    toasted wheat germs,
    roasted malted wheat flour,
    cereal flours or other ingredients characteristic of the composition of special breads.

The dry improver may also include one or more other ingredients not specified above. Preferably, the dry improver according to the invention may be in powder form or in granules. Its dry matter content is advantageously greater than or equal to 85%, and preferably greater than or equal to 90%, even more preferably greater than or equal to 93% and even more preferably greater than or equal to 96% by mass.

For example, a dry improver for French standard bread said "pain courant" according to the invention comprises acid fermented flour, a yeast extract, these two ingredients forming the dry agent according to the invention, ascorbic acid, alpha-amylases and/or xylanases. It may possibly also comprise one or several of the following ingredients: deactivated yeast, lecithin and/or mono- and diglycerides of fatty acids, phospholipases, lipases.

Said dry improver for French standard bread said "pain courant", in other words bread not containing any fatty material or added sugar conforming with French practices or at least French type bread, will be used preferably with a baker's percentage, in other words a percentage by mass relative to the mass of non-fermented flour, equal to between 1 and 10%, preferably between 1 and 5%, more preferably between 1.3 and 5%, and even more preferably between 1.5 and 2%. Said dry improver may be used in the same manner to make bakery products containing or not containing sugar added to the dough and/or fatty material added to the dough, said dough possibly being baked in a pan or not in a pan.

Preferably, the sodium content of the dry agent or the dry improver according to the invention is less than 1.0% by mass on dry matters, preferably less than 0.4% and even more preferably less than 0.2%.

The invention relates to a process for preparing a baker's dough comprising a mix of specific ingredients.

In particular, the invention relates to a process for preparing a baker's dough with ingredients comprising at least non-fermented flour, water, baker's yeast, in other words active yeast, acid fermented flour like that described above with reference to the dry agent according to the invention and yeast extract, also as described above with reference to the dry agent according to the invention.

Water in the dough may be incorporated into the dough as such or partially or totally in the form of a mix with other ingredients or in the form of an ingredient with high humidity, for example such as milk.

By definition, baker's yeast is active yeast or living yeast that will enable fermentation of the dough.

In this process, the dough ingredients are advantageously such that the ratio by weight between dry matters of the acid fermented flour and dry matters of the yeast extract is between 0.8 and 2.6; preferably between 1.0 and 2.3; even more preferably between 1.2 and 2.0; and even more preferably between 1.2 and 1.8.

Usefully, at least part and preferably all of the fermented acid flour and the yeast extract from the dough ingredients is used in the process in the form of a dry agent and/or a dry improver according to the invention.

According to the invention, the dough may be prepared by a direct breadmaking process called "straight dough" or by an indirect process such as the "sponge and dough" process or by any other breadmaking process. Preferably, the breadmaking process according to the invention is a direct breadmaking process, in other words a process including only one kneading.

According to the invention and in accordance with standard practice, an indirect so-called "sponge and dough" process consists of a bread manufacturing method in which a first step consists of mixing water, some of the flour and normally all the baker's yeast and nutrient ingredients useful for the yeast, thus creating a sponge. This mix is allowed to ferment until it is considered to be ready for use to make dough by adding other bread ingredients (definition extracted from the "Glossary of Milling and Baking terms" book by Samuel A. MATZ, Pan-Tech International, 1993).

According to one advantageous embodiment, the dough ingredients are such that the weight ratio between firstly all dry matters of the acid fermented flour and the yeast extract, and secondly the non-fermented flour, is between 0.8 and 2.5%, preferably between 1.0 and 1.5%, and even more preferably between 1.15 and 1.35%. These percentages are baker's percentages in which all percentages are determined with reference to 100 parts by weight of flour used by the baker in the recipe, this flour by definition being not fermented.

For example, a dry improver for a French standard bread said "pain courant" will add the following for 100 parts by mass or 100 kg of non-fermented flour depending on the baker's percentage:

- 1% to 1.8% of dry matters of the dry agent according to the invention consisting of fermented acid flour and yeast extract (namely 1 kg to 1.8 kg of dry matters for 100 kg of flour),
- 0.005% to 0.020% of ascorbic acid (namely 0.005 kg to 0.020 kg for 100 kg of flour), preferably from 0.005% to 0.015% of ascorbic acid,
- 0% to 0.3% of mono-glycerides of saturated fatty acids (namely 0 kg to 0.3 kg for 100 kg of flour),
- fungal alpha-amylases and/or xylanases,
- a solid dilution support or agent so that the dry improver can be used with a easy to dose baker's percentage for example between 1% and 10%, preferably between 1.5% and 5%, and in particular a round number percentage, for example 2%, 5% or 10%.

When the dry improver is present in powder form, this support may for example be an overdried flour.

For example a dry improver for a European non-French type bread will add the following for 100 parts or 100 kg of non-fermented flour depending on the baker's percentage:

- 1% to 1.5% of dry matters of the dry agent according to the invention consisting of fermented acid flour and yeast extract (namely 1 kg to 1.5 kg of dry matters for 100 kg of flour),
- 0.005% to 0.020% of ascorbic acid (namely 0.005 kg to 0.020 kg for 100 kg of flour), preferably from 0.006% to 0.012% of ascorbic acid,
- 0.05% to 0.20% of diacetyl-tartric esters of mono-and di-glycerides (E472e or f emulsifier) (namely 0.05 kg to 0.20 kg for 100 kg of flour),
- one or several alpha-amylases, preferably including an anti-staling alpha-amylase, xylanases, lipases or phopholipases with a gluten network reinforcing effect,
- 0% to 0.20% of one or several stabilizing—thickening agents, keeping the bread softness or facilitating a breadmaking process involving freezing or deep freezing, such as gums or algae extracts, namely 0 kg to 0.20 kg for 100 kg of flour,
- a solid dilution support or agent so that the dry improver can be used with a easy-to-dose baker's percentage, for example between 1% and 10%, preferably between 1.5% and 5%, and in particular, for example 2%, 5% or 10%.

When the dry improver is present in powder form, this support may for example be overdried flour.

For example, in breads like those made in the United States of America using a "SPONGE AND DOUGH" ("levain-levure" in French) or "NO-TIME DOUGH" ("sans temps de fermentation de la pâte en masse" in French) type scheme, the formula will usually include at least the following for 100 parts or 100 kg of non-fermented flour depending on the baker's percentage:

- 0.8% to 2% of dry matters of the dry agent according to the invention consisting of fermented acid flour and yeast extract (namely 0.8 kg to 2 kg of dry matters for 100 kg of flour),
- a mix of oxidants and reduction agents, for example a mix of ascorbic acid and L-cysteine,
- one or several texturising agents, for example an emulsifier such as stearoyl-2-lactylate of calcium,
- a preservative such as calcium propionate,
- one or several enzymatic preparations such as anti-staling enzymes, amylases, hemicellulases, lipases or phospholipases.

In the American breadmaking process, these ingredients may be added either in separate form or in the form of a dry improver, or in the form of a more or less complete pre-mix, comprising for example baker's yeast and a large proportion of the flour. Dough for breads like those made in the United States of America according to the invention will preferably contain a quantity of added sugar varying from 4 to 16% by dry matters as a baker's percentage and/or a quantity of added fatty materials, for example oil, varying from 2% to 6% as a baker's percentage.

Note that the advantage of the process according to the invention essentially lies in the preparation of doughs other than acid sourdoughs. Thus, unlike acid sourdoughs, these doughs do not contain lactic bacteria as a fermentation agent.

The invention also relates to baker's doughs obtained or that could be obtained by such a process according to the invention, and processes for obtaining a baked bakery product in which such a baker's dough is baked in an oven.

The invention relates particularly to such doughs which are frozen.

The invention also relates to parbaked doughs or parbaked frozen doughs, obtained by pre-baking and freezing of these doughs.

The baked product may be bread, preferably a baguette, viennoiserie, a bun, etc.

In particular, the baked product using the process according to the invention may belong to the group comprising French type breads, preferably French standard breads said pain courant", preferably in the form of baguettes, viennoiseries, buns, special breads and generally any type of non French breads comprising fatty materials and/or added sugar, breads like those made in the United States of America obtained using the Sponge and Dough process, breads like those made in the United States of America using the No Time Dough method.

In particular, the invention provides the baker with a process for reducing the salt content in the baker's dough and/or in the baked bakery product by use of a process like that defined above. In particular, this invention allows to reduce the salt content (expressed in NaCl measured by the sodium or $Na^+$ content) to dry matters in the baker's dough or in the baked product, to 2.1% or less by mass, preferably 2.0% or less by mass and even more preferably to 1.8% or less by mass, and even more preferably to less than or equal to 1.6% by mass, while obtaining a baked product with a good taste quality.

Thank to this invention, the baker has a dough for a baked bakery product comprising:
- non-fermented cereal flour,
- baker's yeast, in other words active yeast,
- a content of added NaCl less than or equal to 1.8%; preferably less than or equal to 1.6%; and even more preferably less than or equal to 1.5% by mass in proportion to the mass of the non-fermented flour (baker's percentage), the added salt in the form of NaCl being salt added directly or indirectly by ingredients of the dough when their NaCl content is greater than their natural content, and in any case greater than 1% by mass,
- a quantity of acid fermented flour so as to obtain a baked product after fermentation and baking of the dough with a lactic acid content in crumb equal to at least 500 ppm, preferably between 500 and 3000 ppm, and even more preferably between 750 and 2500 ppm,
- yeast extract, the acid fermented flour and the yeast extract from this dough being acid fermented flour and the yeast extract as defined above for the dry agent according to the invention.

The invention also enables the baker to make good quality baked products using doughs including non-fermented cereal flour(s), baker's yeast, acid fermented flour, yeast extract, and that have a sodium or $Na^+$ content less than or equal to 0.50%; preferably less than or equal to 0.45%, and preferably less than or equal to 0.43% by mass with respect to the dough, these percentages being calculated by mass (quantity of sodium mass with respect to the quantity of dough mass at the end of the last kneading or such as ready to bake). Said doughs preferably contain a quantity of acid fermented flour such that their content of lactic acid is equal to at least 300 ppm, more preferably from 350 to 2500 ppm, and even more preferably from 500 to 2000 ppm.

According to one particularly interesting aspect of this invention, the dough is a frozen dough. Another interesting domain of the invention relates to parbaked frozen doughs that can be obtained by fermentation, pre-baking and deep freezing of a dough according to the invention.

The invention also relates to baked bakery products that can be obtained by fermentation and baking of a dough according to the invention, these baked products particularly including breads, preferably baguettes, viennoiseries and/or buns.

Advantageously, the baked product according to the invention is a baked product based on non-fermented cereal flour, baker's yeast, acid fermented flour, yeast extract, and with a sodium or $Na^+$ content less than or equal to 0.60%; preferably less than or equal to 0.58% and more preferably less than or equal to 0.55%, and even more preferably less than or equal to 0.52% by mass with respect to the mass of the baked product, the acid fermented flour and the yeast extract as defined above respectively in the context of the dry agent according to the invention.

The content of lactic acid in the crumb of the baked product is equal to at least 500 ppm, preferably between 500 and 3000 ppm, and even more preferably between 750 and 2500 ppm.

Preferably, the method for preparation of a baked breadmaking product according to the invention from a dough according to the invention is a process for preparation of a French standard bread said "pain courant" or at least French type bread, with no addition of fatty materials or sugar or dairy products.

Preferably, the baked breadmaking products according to the invention are French standard bread said "pain courant" or at least French type bread such as a baguette. However, the invention is not limited to these applications of the dry taste enhancing agent according to the invention and encompasses all processes, all doughs and all breadmaking products and uses including the new dry flavour enhancing agent for breadmaking according to the invention.

The invention also encompasses application of the dry agent according to the invention as an agent that increases the salty flavour and/or that can lower the sodium or $Na^+$ dose accordingly while keeping an equivalent salty taste, in all cereal products other than dough for baker's products or baked bakery products such as biscuits, food pasta (spaghetti, macaroni, noodles, etc.) and in general, any application of the dry agent according to the invention to make low-salt (NaCl) food products, in other words as a substitute for common salt (NaCl).

The invention also relates to the use of a dry agent according to the invention or a dry improver according to the invention, and as defined above, for preparation of doughs for baked products containing a leavening agent chosen from among chemical leavening, baker's yeast or a combination of them, particularly for preparation of rolled doughs. The corresponding baked products are often very rich in sodium, and this invention provides a means of reducing the salt content while maintaining the appreciated salt flavour.

The invention thus covers a process for the preparation of baked products including:
 preparation of a dough containing non-fermented flour, water, acid fermented flour, yeast extract and a leavening agent chosen from among baker's yeast, chemical leavening and a combination of them,
 leavening of the dough using the leavening agent, and
 baking the leavened dough,
 said process possibly including rolling of the dough between the preparation and leavening steps.

The advantages of this invention are illustrated more clearly in the examples given below for the breadmaking industry.

EXAMPLE 1

Example According to the Invention and Comparative Examples C1 and C2.

A dry flavour enhancing agent according to the invention is prepared by mixing a fermented acid rye flour with a yeast extract.

The fermented acid flour present in the dry agent according to the invention is obtained by drying of a dough based on micronised rye bran fermented by sourdough lactic bacteria. The yeast extract present in the dry agent according to the invention is an autolysate of a brewery yeast belonging to the *Saccharomyces cerevisiae* species.

The yeast extract is a yeast extract fabricated with no added salt. It is a commercial yeast extract developing "acid", "bitter" (very weak), "meaty", "butter", "stock", "baked", "toasted" type notes corresponding to the classic profile of a commercial yeast extract with no particularly marked note.

The dry agent according to the invention has a total content of dry matters equal to at least 90% by mass, of which 60% by mass are dry matters of acid fermented flour and 40% by mass are dry matters of yeast extract.

The dry agent according to the invention is used in the preparation of baguettes with a dose of 1.25 kg of dry matters to 100 kg of non-fermented flour used.

The results obtained using the dry agent according to the invention are compared with the results obtained under the same conditions using a classical commercial fermented flour and a classical or standard commercial yeast extract, each having a dry matters content greater than or equal to 90% by mass.

The classical commercial fermented flour used as a first comparative example is fermented flour marketed by the LESAFFRE INTERNATIONAL Company, Ingredients Division in Marcq-en-Baroeul, France, or the GIE LESAFFRE Company, in Maisons-Alfort, France, under the trade name Arôme Levain® S400 (comparative example C1).

The flavour enhancer known as such and used as the second comparative example is standard yeast extract marketed by the BIO SPRINGER Company in Maisons-Alfort, France, under the trade name Springer® type 101 (comparative example C2), the BIO SPRINGER Company being the main worldwide supplier of yeast extracts.

The IBIS bleu® improver is an improver in the classical formulation for French standard bread said "pain courant" marketed by the GIE LESAFFRE, in Maisons-Alfort, France and LESAFFRE INTERNATIONAL, Ingredients division, in Marcq-en-Baroeul, France. In particular, this improver contains the necessary doses of ascorbic acid and enzymatic preparations to obtain high quality bread using the method described below.

Fresh baker's yeast or compressed baker's yeast is a yeast with about 30% of dry matters sold under the trade name "L'HIRONDELLE bleue" ® by GIE LESAFFRE in Maisons Alfort, France.

Dough formulas containing the dry agent according to the invention and doughs according to comparative examples, expressed in the usual form used in the technical field as a baker's percentage, in other words parts by mass of the ingredient for 100 parts by mass of non-fermented cereal flour(s) used, are given in table 1 below.

TABLE 1

|  | Baguette according to the invention | Baguette in comp. example C1 | Baguette in comp. example C2 |
|---|---|---|---|
| Wheat flour type 55 | 100.0 | 100.0 | 100.0 |
| Water | 64.0 | 64.0 | 64.0 |
| Salt | 1.8 | 1.8 | 1.8 |
| IBIS bleu ® breadmaking improver | 1.0 | 1.0 | 1.0 |
| "L'HIRONDELLE bleue" ® fresh yeast (about 30% dry matters) | 2.5 | 2.5 | 2.5 |
| S400 sourdough aroma |  | 2.0 |  |
| SPRINGER ® type 101 yeast extract |  |  | 0.8 |
| Dry agent* according to the invention expressed in dry matters | 1.25 |  |  |

*60% (D.M.) of fermented acid rye flour and 40% (D.M.) of yeast extract, sodium content <0.4% by mass of dry matters.

The manufacturing scheme used for the example according to the invention and for the two comparative examples, corresponding to an industrial scheme, is as follows:

| Dough mixing: | 4 minutes at 1$^{st}$ speed on model SPI 10 VMI ® spiral kneader |
| Kneading: | 5 minutes at 2$^{nd}$ speed on model SPI 10 VMI ® spiral kneader |
| Bulk fermerntation: | 0 h 20 |
| weighing/rounding: | dough piece weight: 180 g |
| Rest: | 0 h 40 |
| Manual shaping | into a small loaf of bread (batards) |
| Proofing: | 1 h 45 |
| Baking: | 0 h 20 at 205° C. with steam |

Baguettes obtained were subjected to a tasting test by a group of 12 experts, referred thereafter as "panel".

The panel was specifically trained in testing and evaluation of organoleptic properties of breads.

This type of training typically takes place in two phases:
 first phase: set up a common vocabulary of descriptors derived from tasting of various products in the same range
 second phase: classification of products according to descriptors chosen by the panel so as to quantify the aromatic intensity of each descriptor.

The vocabulary determined by the panel within the framework of this study is as follows:
 salt taste
 yeast odour
 cheese crackers odour
 cheese crackers aroma
 honey, spice aroma acid taste
acid odour
fruity odour
herb aroma
cereal aroma.

The results obtained with the example according to the invention and the two comparative examples are given in table 2 and illustrated in FIG. 1.

TABLE 2

| Intensity | Baguette according to the invention | Baguette in comp. example C1 | Baguette in comp. example C2 |
| --- | --- | --- | --- |
| Yeast odour | 4.3 | 4.1 | 3.8 |
| Cereal aroma | 3.3 | 4.7 | 2.7 |
| Cheese crackers odour | 2.3 | 2.3 | 6.3 |
| Cheese crackers aroma | 2.3 | 2.3 | 6.3 |
| Acid odour | 3.3 | 6.3 | 2.9 |
| Acid taste | 3.3 | 6.9 | 2.4 |
| Fruity odour | 2.4 | 4.0 | 2.7 |
| Herb aroma | 2.1 | 3.6 | 2.6 |
| Honey, spice aroma | 2.1 | 3.3 | 3.0 |
| Salty taste | 5.5 | 4.3 | 4.8 |

EXAMPLE 2

Capacity of the Dry Agent According to the Invention to Increase the Salty Flavour of a Baked Bakery Product Five series of baguettes were made using the manufacturing scheme described above in example 1.

The formulas for the corresponding doughs are given below in table 3.

TABLE 3

| | Baguette according to the invention | Baguette in comp. example C3 | Baguette in comp. example. C4 | Baguette in comp. example C5 | Baguette in comp. example C6 |
| --- | --- | --- | --- | --- | --- |
| Type 55 wheat flour | 100.0 | 100.0 | 100.0 | 100.0 | 100.0 |
| Water | 64.0 | 64.0 | 64.0 | 64.0 | 64.0 |
| Salt | 1.8 | 1.5 | 1.8 | 2.1 | 2.4 |
| "L'HIRONDELLE bleue" ® fresh yeast | 2.0 | 2.0 | 2.0 | 2.0 | 2.0 |
| IBIS ® bleu breadmaking improver | 1.0 | 1.0 | 1.0 | 1.0 | 1.0 |
| Dry agent according to the invention in dry matters(*) | 1.25 | 0.0 | 0.0 | 0.0 | 0.0 |

(*)60% (D.M.) of fermented acid rye flour and 40% (D.M.) of yeast extract, sodium content <0.4% by mass of dry matters.

The five series of baguettes obtained were tested by a panel of ten experts who classified these five series of baguettes according to the intensity of their salty flavour.

The five series of baguettes were sorted into order as follows from the lower salty flavour to the most intense salty flavour; baguette C3 (1.5% salt/flour), baguette C4 (1.8% salt/flour), baguette C5 (2.1% of salt/flour), baguette according to the invention, baguette C6 (2.4% of salt/15 flour).

Note that there is no significant difference in observed salty taste between the series of baguettes according to the invention (with 1.8% salt/flour) and the series of comparative baguettes C5 (with 2.1% of salt/flour). On the other hand, the salty taste of the series of baguettes according to the invention (with 1.8% of salt/flour) was significantly more pronounced than the salty taste of the series of comparative baguettes C4 (also with 1.8% salt/flour).

The complete summary of added sodium in the series of baguettes made with the dry agent according to the invention is given in table 4.

TABLE 4

| | Content (baker's percentage) | Sodium content in the ingredient (% by mass) | Added sodium (baker's percentage) |
| --- | --- | --- | --- |
| Corn flour type 55 | 100.0 | 0.003 | 0.0030 |
| Water | 64.0 | 0.000 | 0.0000 |
| Salt | 1.8 | 39.337 | 0.7081 |
| "L'HIRONDELLE bleue" ® fresh yeast | 2.0 | 0.025 | 0.0005 |
| IBIS bleu ® breadmaking improver | 1.0 | 0.003 | 0.0000 |
| Dry matters of the dry agent according to the invention | 1.25 (including 0.75 of acid fermented flour and 0.50 of yeast extract expressed as dry matters) | 0.158 | 0.0020 |
| Total | 170.05 | | 0.7136 |
| Total sodium in recipe (baker's percentage) | | | 0.72 |
| Total sodium for 100 g of dough | | | 0.42 g |
| Total sodium for 100 g of bread | | | 0.54 g |
| Total NaCl for 100 g of bread (calculated based on the sodium content) | | | 1.38 g |
| Proportion of sodium or NaCl present without added salt as a proportion of total salt (NaCl) | | | 0.8% |

A significant synergetic effect is observed between the two ingredients (acid fermented wheat flour and yeast extract) of the dry flavour enhancer agent according to the invention.

In particular, the following are observed:
the intensity of the salty flavour obtained with the dry agent according to the invention exceeds the intensity of the salty taste that was provided based on the ingredients of the agent and their corresponding quantities used,
the intensities of the "cheese crackers" odour and aroma obtained with the dry agent according to the invention are less than the intensities that were expected.

Thus, this invention is a significant improvement over the state of the art, particularly by achieving a flavour enhancing effect over a wide range of bakery products.

In particular, this invention provides a means of achieving a flavour enhancing effect over a wide range of bakery products, while reducing the salt quantity added to the baker's dough.

These observations are valid for all cereal products such as biscuit products and food pasta.

The invention claimed is:

1. A dough for bakery product selected from the group consisting of French type breads, baguettes, buns, special breads, non French breads comprising fatty materials or added sugars, breads obtained using the Sponge and Dough process and breads obtained using the No Time Dough method, said dough comprising:
    non-fermented cereal flour(s),
    baker's yeast, and
    a dry improving agent consisting of:
        a dry flavour enhancing agent consisting of 60% dry matter of fermented acid rye flour and 40% dry matter of a yeast extract which is an autolysate of a brewing yeast belonging to the species *Saccharomyces cerevisiae* having a sodium content <0.4% by mass of dry matter; and
        a standard improver for current French bread containing ascorbic acid enzymatic preparations,
    wherein the acid fermented flour is obtained by drying a flour fermented using lactic bacteria;
    wherein said dough has a sodium content less than or equal to 0.50% by mass with respect to the dough,
    wherein the amount of the dry improving agent is between 1.5 and 2% by mass relative to the mass of the non-fermented cereal flour(s).

2. The dough according to claim 1, wherein the content of dry matter of the dry flavour enhancing agent is greater than or equal to 85% by mass.

3. The dough according to claim 1, wherein the content of dry matter of the dry flavour enhancing agent is greater than or equal to 96% by mass.

4. The dough according to claim 1, wherein the acid fermented flour is derived from a fermented dough containing one or several cereal flours that can be used for breadmaking, one or several flours derived from a bran enriched mill product or a mix of one or more cereal flours that can be used in breadmaking with one or several flours derived from a bran enriched mill product.

5. The dough according to claim 1, wherein lactic acid is present in the fermented acid flour in an amount that is greater than or equal to 50 g per kg of fermented flour.

6. The dough according to claim 5, wherein lactic acid is present in the fermented acid flour in an amount that is greater than or equal to 100 g per kg of fermented flour.

7. The dough according to claim 1, wherein the yeast extract contains a brewer's yeast extract.

8. A dough for bakery product according to claim 1, wherein the bakery product is selected from the group consisting of French type breads, baguettes, viennoiseries, buns, special breads, non French breads comprising fatty materials or added sugars, breads obtained using the Sponge and Dough process and breads obtained using the No Time Dough method.

9. The dough according to claim 8, wherein the acid fermented flour of the dry flavour enhancing agent contains an amount of lactic acid greater than or equal to 70 g per kg, and provides at least 300 ppm of lactic acid, in the dough.

10. The dough of claim 8, wherein said dough is frozen.

11. A dough for bakery product presenting a taste profile with no cheese crackers notes and selected from the group consisting of French type breads, baguettes, viennoiseries, buns, special breads, non French breads comprising fatty materials or added sugars, breads obtained using the Sponge and Dough process and breads obtained using the No Time Dough method, said dough comprising:
    non-fermented cereal flour,
    baker's yeast,
    a content of added NaCl less than or equal to 1.8% by mass in proportion to the mass of non-fermented flour, and
    a dry improving agent comprising:
        a dry flavour enhancing agent consisting of 60% dry matter of fermented acid rye flour and 40% dry matter of a yeast extract which is an autolysate of a brewing yeast belonging to the species *Saccharomyces cerevisiae* having a sodium content <0.4% by mass of dry matter; and
        a standard improver for current French bread containing ascorbic acid, enzymatic preparations,
    wherein the acid fermented flour is obtained by drying a flour fermented using lactic bacteria,
    wherein the amount of dry improving agent is between 1.5 and 2% by mass relative to the mass of the non-fermented cereal flour, and
    wherein the quantity of acid fermented flour in the dry flavour enhancing agent is such that the baked product obtained after fermentation and baking of the dough has a lactic acid content in crumb equal to at least 500 ppm.

12. A dry flavour enhancing agent for baked bakery product selected from the group consisting of French type breads, baguettes, viennoiseries, and non-French breads comprising added sugars, said dry flavour enhancing agent consisting of 40% dry matter of a yeast extract which is an autolysate of a brewing yeast belonging to the species *Saccharomyces cerevisiae* having a sodium content <0.4% by mass of dry matter and 60% dry matter of fermented acid rye flour, wherein the acid fermented flour is obtained by drying a flour fermented using lactic bacteria.

* * * * *

UNITED STATES PATENT AND TRADEMARK OFFICE
CERTIFICATE OF CORRECTION

PATENT NO. : 9,681,672 B2
APPLICATION NO. : 10/588853
DATED : June 20, 2017
INVENTOR(S) : Camille Dupuy, Pascal Lejeune and Jean-Jacques Muchembled Page 1 of 1

It is certified that error appears in the above-identified patent and that said Letters Patent is hereby corrected as shown below:

On the Title Page

Under item (30) Foreign Application Priority Data:
Delete "October 2, 2004   (FR)    04 01258" and insert --February 10, 2004   (FR)   04 01258--

Signed and Sealed this
First Day of August, 2017

Joseph Matal
*Performing the Functions and Duties of the*
*Under Secretary of Commerce for Intellectual Property and*
*Director of the United States Patent and Trademark Office*